United States Patent [19]

Valiot et al.

[11] 4,415,603

[45] Nov. 15, 1983

[54] PROCESS FOR PAINTING WHICH CAN BE USED FOR MARKING ROADS

[75] Inventors: Catherine Valiot, Compiegne; Francis Lemaire, Bagnols-sur-Ceze; Gilbert Gaussens, Meudon, all of France

[73] Assignee: Commissariat a l'Energie Atomique, Paris, France

[21] Appl. No.: 294,356

[22] Filed: Aug. 19, 1981

[30] Foreign Application Priority Data

Aug. 28, 1980 [FR] France .............................. 80 18682

[51] Int. Cl.³ .............................................. B05D 3/06
[52] U.S. Cl. ................................... 427/54.1; 427/137; 526/90
[58] Field of Search ........................ 427/44, 54.1, 137; 526/93, 90

[56] References Cited

U.S. PATENT DOCUMENTS

| | | | |
|---|---|---|---|
| 3,322,661 | 5/1967 | Yoshikawa et al. | 204/159.17 |
| 3,861,948 | 1/1975 | Samour et al. | 526/93 |
| 3,956,217 | 5/1976 | Gazeley | 260/29.7 NR |
| 4,222,835 | 9/1980 | Dixon | 427/54.1 |
| 4,230,766 | 10/1980 | Gaussens et al. | 427/54.1 |
| 4,255,464 | 3/1981 | Van Der Kallen | 427/54.1 |
| 4,296,006 | 10/1981 | Bugdahl et al. | 427/137 |

OTHER PUBLICATIONS

"Encyclopedia of Poly. Science and Tech.," John Wiley & Sons Inc., N.Y., (1967), vol. 7, pp. 362-364.

*Primary Examiner*—John H. Newsome

[57] ABSTRACT

Process for painting a substrate, wherein the coating of a paint containing a polymerizable binder to which a peroxide is added at the time of application is applied to the substrate and wherein the thus applied coating of paint then undergoes irradiation by means of ultraviolet rays. A particular application of the invention is to the marking of road surfaces.

6 Claims, No Drawings

PROCESS FOR PAINTING WHICH CAN BE USED FOR MARKING ROADS

BACKGROUND OF THE INVENTION

The present invention relates to a process for painting a substrate, which can in particular be used for road marking purposes.

Various processes are presently used for producing road markings, i.e. for making horizontal signs, particularly in the form of continuous and/or discontinuous lines or strips on road surface coverings.

All these processes have the common disadvantage of closing the road for long periods leading to a disturbance to the traffic flow involving accident risks, a certain slowness in carrying out the work, high manpower costs through men having to beacon off the road and in certain cases the necessity of opening the road to traffic before the coating applied is dry, so that it is inevitable that the marking strips are made dirty.

In addition, rapid painting processes are of considerable interest for the mass production of prepainted components, particularly intended for the building industry.

BRIEF SUMMARY OF THE INVENTION

The object of the invention is in particular to obviate the disadvantages referred to hereinbefore and to this end proposes a process which complies better with existing requirements than the hitherto known processes.

The present invention therefore relates to a process for painting a substrate wherein a coating of paint containing a polymerizable binder comprising a photoinitiator is applied to the substrate and at the time of application a peroxide is added thereto and wherein the coating of paint applied in this way is then exposed to irradiation by means of ultraviolet rays.

Preferably according to the invention to the said paint is also added a metal reducing salt at the time of applying the coating of paint to the substrate. Advantageously the coating of paint irradiated by means of ultraviolet rays undergoes a complementary irradiation by means of infrared rays.

DETAILED DESCRIPTION OF THE PREFERRED EMBODIMENTS

The invention is also directed at other arrangements which are preferably used at the same time and to which more detailed reference is made hereinafter. A better understanding thereof will be provided by the following description of non-limitative embodiments.

In order to carry out road marking according to the process of the invention the following or an equivalent procedure is adopted. To the road covering or the like is applied a coating of a paint containing a polymerizable binder to which is added at the time of its application to the road a peroxide and optionally a reducing metal salt. The thus applied paint coating then undergoes irradiation by means of ultraviolet rays, optionally followed by irradiation by means of infrared rays.

The polymerizable binder used in the formation of the said paint contains at least one reactive prepolymer, at least one unsaturated monomer, at least one polyunsaturated monomer and at least one photoinitiator.

The reactive prepolymer which constitutes approximately 15 to 50% by weight of the binder composition, can be an epoxy-acrylate resin, a urethane-acrylate resin, a polyester-acrylate resin or an unsaturated acrylic resin.

The monounsaturated monomer is a product containing either an acrylate termination, e.g. a compound of formula $CH_2=CH-COOR$ in which R stands for a hydrocarbon radical, such as acrylic acid, butyl acrylate, methyl acrylate, ethylene glycol acrylate, etc., or a methacrylate termination, e.g. a compound of formula

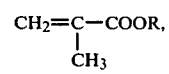

such as methacrylic acid, butyl methacrylate, ethyl methacrylate, ethylene glycol methacrylate, etc., or a vinyl termination, e.g. a compound of formula $CH_2=CH-R$, such as vinyl-pyridine, vinyl-pyrrolidone, styrene and its derivatives. The monounsaturated monomers or the mixture of monounsaturated monomers represent 10 to 60% by weight of the binder.

The polyunsaturated monomer is a product containing two or more acrylate and/or methacrylate and/or vinyl terminations such as diethylene glycol diacrylate, tetraethylene glycol diacrylate, polyethylene glycol diacrylate, hexane diol diacrylate, trimethanol propane triacrylate, ethylene glycol dimethacrylate, trimethylol propane trimethacrylate, pentaerithritol tetracrylate or divinyl-benzene.

The polyunsaturated monomers or the mixture of polyunsaturated monomers represent 5 to 50% by weight of the binder.

The photoinitiator, whose function is to absorb the energy of the photons of the U.V. radiation and transmit this energy to the various reactive constituents of the mixture in order to initiate the polymerization and cross-linking reactions is chosen from among:

photoinitiators containing a carbonyl group

such as e.g. benzoin, benzoin ethers, benzophenone, derivatives containing a halogenated carbonyl group, etc.;

photoinitiators in the form of nitrogenous compounds such as e.g. azoethane, $\alpha,\alpha'$-azobisisobutyronitrile, azoxystyrene, etc.;

photoinitiators in the form of organic sulphur compounds such as e.g. diphenyl disulphide, dibenzothiazole, benzodithiocarbamate, etc.;

photoinitiators in the form of halogenated compounds such as naphthalene sulphochlorides, halogenated metal salts, etc.

This photoinitiator represents 0.1 to 10% and preferably 0.5 to 2% by weight of the polymerizable binder.

The peroxide which is incorporated into the paint at the time of its application and whose presence leads to the polymerization of the paint under the influence of the calories dissipated by the U.V. radiation can be chosen from the group including 2,4-dichlorobenzoyle peroxide, lauroyl peroxide, benzoyl peroxide, acetylcyclohexane sulphanyl peroxide, 3,5,5-trimethyl hexanoyl isononanoyl peroxide, dioctanoyl peroxide, cyclohexyl peroxydicarbonate, 2-ethyl-hexyl peroxydicarbonate, n-butyl peroxydicarbonate, tert-butyl-cyclohyxyl peroxydicarbonate, iso-propyl peroxydicarbonate, methyl ethyl ketone peroxide, methyl isobutyl ketone peroxide and cyclohexanone peroxide.

Polymerization takes place protected from air, which is a powerful inhibitor of radical reactions initiated by the peroxide, due to the presence of a polymerized surface layer which forms as soon as the coating of paint is applied to the covering under the influence of U.V. radiation and due to the presence of photoinitiators.

If the thermal power dissipated by the U.V. irradiation is not adequate, it is possible to follow this irradiation by I.R. irradiation with a higher heating power.

The peroxide quantity used represents 0.1 to 10 and preferably 1 to 5% by weight of the binder.

The reducing metal salt which is preferably added to the paint at the time when it is applied to the road covering is a salt of a mineral acid, particularly $H_2SO_4$ and HCl or an organic acid, particularly acetic or oxalic acids and a metal which, in its ionic form can have several oxidation numbers. With respect to these metals specific reference is made to iron, tin and cerium.

In the case of a metal salt which leads to a discolouration, the latter can be corrected by an appropriate choice of the pigments and fillers, as well as the concentration thereof.

The metal salt quantity used represents 0.1 to 10 and preferably 0.5 to 3% by weight of the binder.

As certain metal salts are not directly soluble in the binder, they are introduced in the form of finely dispersed aqueous solutions, the quantity of water necessary for dissolving purposes then representing 0.1 to 10 and preferably 0.5 to 2% by weight of the binder.

On using the metal salt and the peroxide at the time of applying the coating of paint, a redox reaction occurs at ambient temperature which initiates the polymerization process by radical reaction. This polymerization takes place protected from atmospheric oxygen due to the instantaneous polymerization of a surface film of the coating of paint under ultraviolet radiation and due to the presence of the photoinitiator. In practice paint coatings with a thickness of 300 to 500 $\mu$m are applied.

In addition to the binder, the peroxide and preferably the metal salt introduced at the time of application, the paint contains pigments, particularly titanium dioxide in a quantity of in general 5 to 30% by weight, based on the total weight and fillers generally chosen from among products of the group including silica, calcium carbonate, kaolinite, barium sulphate, asbestos, diatomaceous earths and thixotropic fillers, the quantity used being generally 20 to 60% by weight, based on the paint.

In addition, the marking paint coatings are frequently more retroreflecting, due to the addition of glass balls at the time of application. The grain size of these balls is between 100 $\mu$m and 1 mm, the quantity of crushed balls representing 40 to 80% by weight of the dry paint deposited.

Having given the above details regarding the application of the coating of paint constituting the road marking, the following procedure can be adopted.

Consideration will firstly be given to the case where only a peroxide is added to the paint, with no reducing metal salt.

Firstly the binder containing the photoinitiator and then the actual paint without the glass balls are prepared and at the last moment the necessary peroxide quantity is dissolved in the paint. The paint coating forming the marking is applied in two successive spraying operations (spray gun), the first depositing the paint and the second the glass balls. At the end of the second spraying operation the coating of paint is irradiated by U.V. rays which, via the photoinitiator brings about the polymerization of the surface coating and via the peroxide the partial or complete polymerization of the inner coating.

If preliminary tests show that the polymerization of the inner coating is only of a partial nature, U.V. irradiation is immediately followed by I.R. irradiation, which permits the complete polymerization of the inner coating by means of the peroxide. At the end of the U.V. and optionally the I.R. irradiation the paint is totally polymerized and no problems are caused by vehicles running over it. As a function of the photoinitiator and peroxide quantities used and the irradiation powers employed, the speed at which the coating of paint is applied can vary between 10 and 150 meters per minute, i.e. 0.6 to 9 km/h.

In the case when the reducing metal salt is also used the binder, which may or may not contain the photoinitiator and then the paint, without the glass balls, are prepared.

The paint is divided up into two parts. Into the first part is dissolved the necessary peroxide quantity and the necessary photoinitiator quantity, if the latter has not been introduced into the binder. The necessary quantity of the reducing metal salt is dissolved in the second part.

The paint is once again applied in the form of two successive spraying operations using a spray gun, the first consisting of combining the two reactive parts of the paint by convergent jets and the second consisting of applying the glass balls.

As the two reactive parts of the paint are intimately mixed polymerization is initiated as soon as the first spraying operation is completed. At the end of the second spraying operation with the paint irradiated by the U.V. rays which causes, via the photoinitiator, the polymerization of the upper coating which was poorly polymerized during the reaction between the two reactive parts of the paint as a result of the inhibiting effect of atmospheric oxygen. A few seconds, i.e. max. 10 to 30 seconds, after the end of U.V. irradiation, the paint is totally polymerized and can withstand vehicles travelling on it. As a function of the quantities of photoinitiator, peroxide and metal salt used, as well as the U.V. radiation power the speed at which the coating of paint constituting the road marking can be applied is 10 to 150 m/min., i.e. 0.6 to 9 km/h.

The following examples relate to advantageous embodiments.

EXAMPLE 1

A binder with the following composition is prepared:

| | |
|---|---|
| epoxy-acrylate resin of the type known under the trademark Ebecryl 600 | 32% by weight |
| butyl acrylate | 33% by weight |
| polyethylene glycol diacrylate | 33% by weight |
| photoinitiator formed by benzoine ethers of the type known under the trademark Vicure 30 | 2% by weight. |
| The paint has the following composition: | |
| binder | 46% by weight |
| titanium dioxide | 9% by weight |
| various fillers | 45% by weight. |

1% by weight, based on the weight of the paint, of benzoyle peroxide is then added. The paint is sprayed in the form of a coating with an approximate thickness of 350 μm, on to which is sprayed a quantity of glass balls representing approximately 50% by weight, based on the paint.

The coating formed in this way at a speed of 30 m/min. is then treated with a U.V. radiator with a linear power of 80 W/cm and immediately thereafter, still at a speed of 30 m/min. with an I.R. irradiator with a linear power of 50 W/cm. At the end of I.R. irradiation the paint is completely dry and fully polymerized. The glass balls adhere in a completely satisfactory manner to the paint.

EXAMPLE 2

The binder and paint compositions are as described in Example 1.

1% by weight, based on the paint, of 2,4-dichlorobenzoyl peroxide is added.

This paint is sprayed in the form of a coating of approximate thickness 350 μm and on to the latter is sprayed the glass balls (proportion as in Example 1).

The coating formed at a speed of 12 m/min. is treated by means of a U.V. irradiator with a linear power of 80 W/cm.

On leaving the U.V. irradiator the paint is completely dry and completely polymerized. The glass balls have an excellent adhesion in the paint.

EXAMPLE 3

The following binder composition is prepared:

| | |
|---|---|
| epoxy-acrylate resin like that covered by the trademark Ebecryl 600 | 32% by weight |
| butyl acrylate | 32% by weight |
| polyethylene glycol diacrylate | 32% by weight |
| photoinitiator of example 1 | 4% |

The paint composition is the same as in Example 1.

Based on the paint 3% by weight of 2,4-dichlorobenzoyl peroxide are added.

This paint is sprayed in the form of a coating of approximate thickness 350 μm and on to the coating is sprayed the glass balls (same proportion as in Example 1).

This coating is treated at a speed of 50 m/min with a U.V. irradiator having a linear power of 80 W/cm and immediately afterwards with an I.R irradiator with a linear power of 100 W/cm.

Following I.R. irradiation the paint is completely dry and completely polymerized. The glass balls have an excellent adhesion in the paint.

EXAMPLE 4

The binder and paint compositions are the same as described in Example 1.

The paint formed is divided into two identical parts. 1% by weight of 2,4-dichlorobenzoyl peroxide is added to one of the two parts. 1% by weight of ferrous sulphate is added to the second part by means of 2% by weight, based on the total paint weight. These two paint parts are simultaneously sprayed in equal quantities to give a coating of approximate thickness 350 μm. Immediately following this glass balls are sprayed on to the paint coating (proportion as in Example 1).

Approximately 10 seconds after the end of the second spraying operation, the paint-balls coating is treated at a speed of 40 m/min. using a U.V. irradiator with a linear power of 80 W/cm. Following this the paint is completely dry and polymerized. The glass balls have an excellent adhesion in the paint.

EXAMPLE 5

The binder and paint proportions are the same as described in Example 1.

The paint formed is divided into two identical parts. 1% by weight of benzoyl peroxide is added to the first part. 1% by weight of ferrous sulphate is added to the second part by means of 2% by weight of water, based on the total paint weight.

These two parts are simultaneously sprayed in equal quantities giving a coating of approximate thickness 350 μm. Glass balls are immediately thereafter sprayed on to the paint coating (proportion as in Example 1).

About 10 seconds after the end of the second spraying operation, this paint coating is treated at a speed of 40 m/min., using a U.V. irradiator with a linear power of 80 W/cm. Following this irradiation the paint is completely dry and polymerized. The glass balls have an excellent adhesion in the paint.

EXAMPLE 6

The binder and paint compositions are as described in Example 1.

The paint formed is divided into two identical parts. 1% by weight of 2,4-dichlorobenzoyl peroxide is added to the first part. 1% by weight of stannous chloride is added to the second part by means of 2% by weight of water, based on the total paint weight.

These two parts are simultaneously sprayed in equal quantities to give a paint coating with an approximate thickness of 350 μm. Immediately following this glass balls are sprayed on to this paint coating (proportion as in Example 1).

Approximately 10 seconds after the end of the second spraying operation the coating is treated at a speed of 35 m/min. using a U.V. irradiator with a linear power of 80 W/cm. At the end of this irradiation operation the paint is completely dry and polymerized. The glass balls have an excellent adhesion in the paint.

EXAMPLE 7

A binder with the following composition is prepared:

| | |
|---|---|
| epoxy-acrylate resin of the type known under the trademark Ebecryl 600 | 32% |
| butyl acrylate | 33% |
| hexane diol diacrylate | 33% |
| photoinitiator of example 1 | 2% |

The composition of the paint is as described in Example 1.

This paint is divided up into two identical parts. 1% of benzoyl peroxide is added to the first part. 1% by weight of ferrous sulphate is added to the second part by means of 2% by weight of water, based on the total paint weight.

These two parts are simultaneously sprayed in equal quantities to give a coating of approximate thickness 350 μm. Immediately thereafter glass balls are sprayed on to this paint coating (proportion as in Example 1).

Approximately 10 seconds after the end of the second spraying operation the coating is treated at a speed of 40 m/min. using a U.V. irradiator with a linear power of 80

W/cm. After this irradiation process paint is completely dry and polymerized. The glass balls have an excellent adhesion in the paint.

EXAMPLE 8

A binder with the following composition is prepared:

| | |
|---|---|
| commercial unsaturated acrylic resin (Ebecryl 600) | 32% by weight |
| butyl acrylate | 33% by weight |
| polyethylene glycol diacrylate | 33% by weight |
| photoinitiator according to Example 1 | 2% by weight |

The paint composition is the same as in Example 1.

The paint formed is divided into two identical parts. 3% by weight of benzoyl peroxide are added to the first part. 3% by weight of ferrous sulphate are added to the second part by means of 2% by weight of water, based on the total paint weight.

These two fractions are simultaneously sprayed in equal quantities to give a paint coating of approximate thickness 350 μm. Immediately thereafter glass balls are sprayed on to this paint coating (proportion as in Example 1).

Approximately 10 seconds after the end of the second spraying operation the coating is treated at a speed of 40 m/min. using a U.V. irradiator with a linear power of 80 W/cm. At the end of this irradiation process the paint is completely dry and polymerized. The glass balls have an excellent adhesion in the paint.

EXAMPLE 9

A binder with the following composition is prepared:

| | |
|---|---|
| epoxy-acrylate resin of the type known under the trademark Ebecryl 600 | 32% by weight |
| butyl acrylate | 33% by weight |
| polyethylene glycol diacrylate | 33% by weight |
| photoinitiator of the type known under the trademark Trigonal 15 (mixture of benzoine ethers and other products) | 2% by weight |

The paint formed is divided into two identical parts. 1% by weight of benzoyl peroxide is added to the first part. 1% by weight of ferrous sulphate is added to the second part by means of 2% by weight of water, based on the total paint weight.

These two parts are simultaneously sprayed in equal quantities to give a coating of approximate thickness 350 μm. The glass balls are sprayed on to this paint coating immediately afterwards (proportion as in Example 1).

Approximately 10 seconds after the end of the second spraying operation the coating is treated at a speed of 30 m/min using a U.V. radiator with a linear power of 80 W/cm. At the end of this irradiation process the paint is completely dry and polymerized. The glass balls have an excellent adhesion in the paint.

EXAMPLE 10

The binder and paint compositions are the same as described in Example 1.

The paint formed is divided up into two identical parts. 1% by weight of 2,4-dichlorobenzyl peroxide is added to the first part. 1% by weight of Mohr's salt is added to the second part by means of 2% by weight of water, based on the total paint weight (it is pointed out that Mohr's salt is the double sulphate of iron and ammonium of formula $FeSO_4.(NH_4)SO_4.6H_2O$).

These two parts are simultaneously sprayed in equal quantities to give a paint coating with an approximate thickness of 350 μm. Immediately thereafter glass balls are sprayed on to this paint coating (proportion as in Example 1).

Approximately 10 seconds after the end of the second spraying operation the coating is treated at a speed of 35 m/min using a U.V. irradiator with a linear power of 80 W/cm. At the end of this irradiation process the paint is completely dry and polymerized. The glass balls have an excellent adhesion in the paint.

Thus, no matter what embodiment is adopted a road marking process is obtained which in particular has the following advantages compared with the hitherto known processes:

leads to an almost instantaneous drying of the deposited paint, enabling traffic to travel over it as soon as application is completed, so that there is no need to close the road with all the resulting disadvantages;

possibility of application and therefore drying at high speed without disturbing the traffic flow;

great ease of use requiring no large and/or complex equipment;

almost independent of ambient temperature;

no need to use pollution-generating solvents.

The invention is not limited to the embodiments described hereinbefore and numerous variants are possible thereto without passing beyond the scope of the invention.

What is claimed is:

1. A process for painting a substrate which comprises applying to the substrate a coating of a paint containing
    (a) a polymerizable binder comprising from about:
        15 to 50% by weight of a reactive prepolymer selected from the group consisting of epoxy acrylate resins, urethanacrylate resins, polyesteracrylate resins and unsaturated acrylic resins;
        10 to 60% by weight of monounsaturated monomers;
        5 to 50% by weight of polyunsaturated monomers;
        0.1 to 10% by weight of at least one photoinitiator; and
    (b) from about 0.1 to 10% by weight, based on the binder, of a peroxide, and from about 0.1 to 10% by weight, based on the binder, of a metal salt selected from the group consisting of ferrous sulphate, stannous chloride and Mohr's salt; the metal salt and the peroxide being added to the binder at substantially the time of application of the coating of paint; and irradiating the thus applied coating with ultraviolet rays.

2. A process according to claim 1, wherein the coating is irradiated further with infrared rays.

3. A process according to claim 1, wherein the peroxide is selected from the group consisting of benzoyl peroxide and 2,4 dichlorobenzoyl peroxide.

4. A process according to claim 1, wherein the peroxide is present in an amount of from about 1 to 5% by weight, based on the binder.

5. A process according to claim 1, wherein the metal salt is present in an amount of from about 0.5 to 3% by weight, based on the binder.

6. A process according to any one of claims 1 to 5 wherein the substrate is a road and the paint is used for marking the same.

* * * * *